Dec. 27, 1966   H. D. BAUMANN   3,293,992
FLUID ACTUATOR
Filed Aug. 25, 1964

HANS D. BAUMANN
INVENTOR.

BY
Norman S. Blodgett

United States Patent Office 3,293,992
Patented Dec. 27, 1966

3,293,992
FLUID ACTUATOR
Hans D. Baumann, Decatur, Ill., assignor to A. W. Cash Company, Decatur, Ill., a corporation of Illinois
Filed Aug. 25, 1964, Ser. No. 391,891
2 Claims. (Cl. 91—386)

This invention relates to an actuator and, more particularly, to apparatus arranged to adjust a valve setting in accordance with a signal air pressure.

It is common practice to provide for the adjustment of a valve to an opened, a closed, or an intermediate position by use of a hydraulic or air-operated motor, the primary movement usually taking place by means of an air signal pressure operating on a large diaphragm. One of the limitations on the use of such an actuator is that the amount of movement available is limited by the amount of displacement that the center of the diaphragm can make. This means that, if a large valve is used, the actuator must be very large in order to permit the center of the diaphragm to participate in the proper amount of displacement. With the prior art devices, it has been impossible also to adjust the position of the stroke or the length of the stroke during operation. On the contrary, it has been found necessary to shut down the entire apparatus in order to accomplish such an adjustment; when the valve is part of a complex system, this is very difficult to do. These and other difficulties experienced with the prior art devices have been obviated in a novel manner by the present invention.

It is, therefore, an outstanding object of the invention to provide an actuator capable of an extremely long stroke.

Another object of this invention is the provision of an actuator whose stroke length is adjustable during its operation.

A further object of the present invention is the provision of an actuator having a fail-safe action in case of signal or supply pressure failure.

It is another object of the instant invention to provide an actuator having means to meet individual frequency response requirements, means being provided to adjust the stroking speed.

With these and other objects in view, as will be apparent to those skilled in the art, the invention resides in the combination of parts set forth in the specification and covered by the claims appended hereto.

Figure 1:
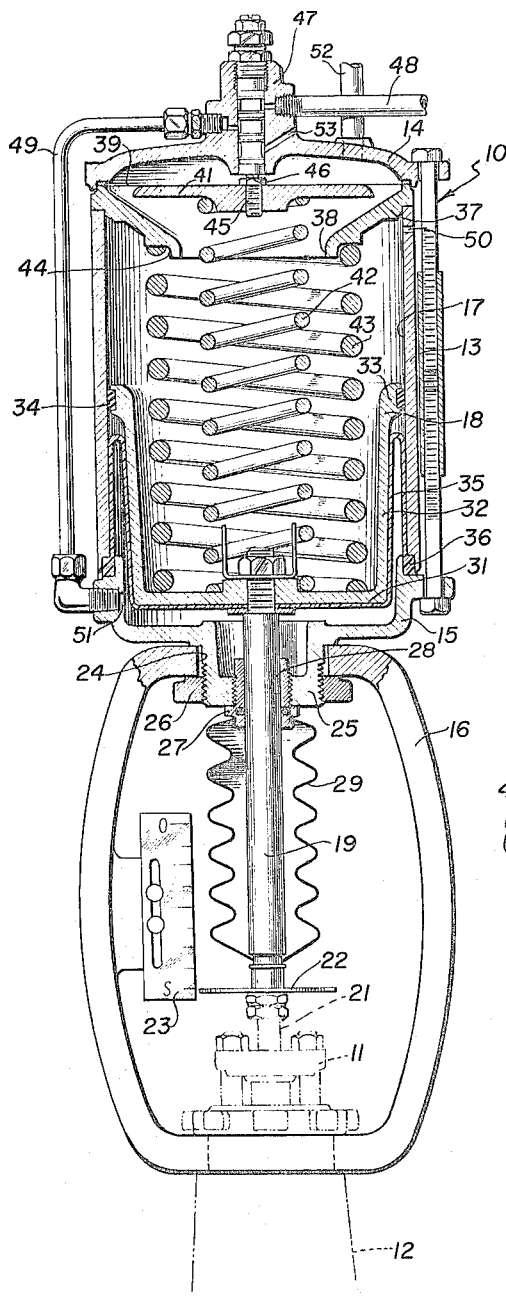
Figure 2:
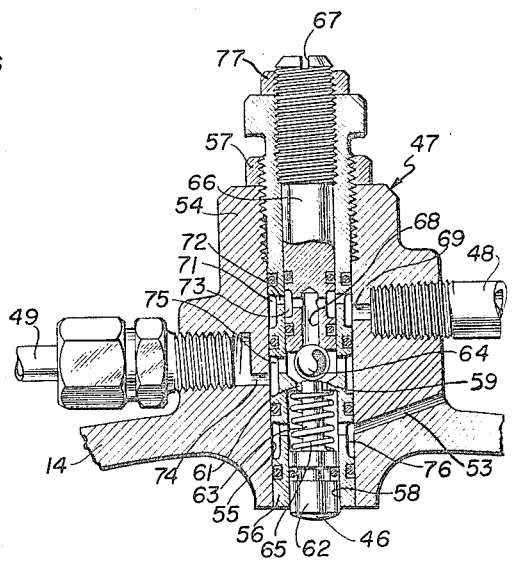

The character of the invention, however, may be best understood by reference to one of its structural forms, as illustrated by the accompanying drawings in which:

FIG. 1 is a vertical sectional view of apparatus embodying the principles of the present invention, and FIG. 2 is an enlarged sectional view of a portion of the invention.

Referring to FIG. 1, which best shows the general features of the invention, the actuator, indicated generally by the reference numeral 10, is shown in use with the bonnet 11 of a valve 12 which, for the purposes of illustration, may be a gate valve. It will be understood, however, that the actuator may be used with almost any type of valve by a suitable mechanical linkage between the actuator and the valve.

The actuator is shown as consisting of a housing 13, having an upper head 14 and a lower head 15, the lower head being connected to a support 16 in the form of a loop. The housing 13 is provided with a cylindrical bore 17 in which is slidably carried a piston 18 having a piston rod 19 extending through the head 15 and connected to the stem 21 of the valve 12. The rod 19 is provided with a horizontal disc 22 whose periphery lies adjacent a scale 23 adjustably mounted on the interior of the support 16. The support 16 has an upper horizontal portion having an aperture 24 through which extends a threaded neck 25 extending downwardly from the lower head 15. On the threaded neck is fastened a nut 26 which clamps the head 15 and the support 16 together. Threaded in the neck 25 is a plug 27 having a central bore 28 through which the rod 19 slides. A bellows 29 is provided formed of a rubber-like flexible material, such as Teflon, having one end attached in a groove in the plug 27 and the other end fastened to the rod 19 adjacent the disc 22.

The piston 18 is of a cup-like conformation having a disc-like bottom 31 and a tapered flange 32 which is considerably spaced from the surface of the bore 17. At the upper end of the flange, however, it is provided with a radially-extending bead 33 whose outer surface is provided with an annular groove carrying a guide ring, such as a nylon seal 34, which fits closely against the surface of the bore 17. In addition, the piston 18 is provided with a seal 35 formed of a flexible rubber-like material, such as Buna-N, which is of a generally diaphragm-like configuration and has at its outer periphery an enlarged bead 36 which is clamped between the head 15 and the body 13 of the actuator. The central part of this seal 35 is clamped between the piston rod 19 and the bottom 31 of the piston, while the intermediate portion is folded double in the space between the piston and the bore.

In the upper part of the housing 13 is mounted an annular member 37 having an aperture 38 in its central portion and having its outer periphery clamped between the housing 13 and the head 14. Extending across the top of the housing and held in place by the head 14 is a thin metal diaphragm 39 having a disc-like pressure plate 41 mounted centrally thereof. A coil spring 42 extends between the pressure plate 41 and the bottom 31 of the piston 32. A larger coil spring 43 extends between the bottom of the piston and a groove 44 formed in the annular member 37 and concentric with the aperture 38.

A flat-headed screw 45 is located centrally of the pressure plate 41 and its upwardly-directed flat head contacts a button 46 forming part of a valve 47 formed in the head 14. A conduit 48 enters the valve 47 from a source of pressure air (not shown). A conduit 49 connects the valve 47 to a port 51 formed on the lower head 15 of the actuator. A conduit 52 connects the space between the upper head 14 and the diaphragm 39 to a source of signal air pressure (not shown). An exhaust passage 53 extends from the valve 47 and a small opening 50 extends through the wall of the housing 13 at a point adjacent the annular member 37.

Referring to FIG. 2, which shows the details of the valve 47 formed in the head 14, it can be seen that the head 14 is provided with a large abutment 54 through which extends a vertical bore 55. In this bore is mounted a tubular body 56 connected to a threaded portion of the bore 55 and held in place by a lock nut 57. The body 56 is provided with an interior bore 58 having a wall 59 at its intermediate portion which wall has an aperture 61. Slidable in the bore 58 below the wall 59 is a small plunger 62 whose lower end protrudes from the valve and is provided with the button 46. The plunger is sealed in the usual way by means of a groove and elastomer O-ring. The upper part of the plunger is provided with a rod of reduced diameter 63 which extends through the aperture 61 in the wall 59 and contacts a ball 64. A coil spring 65 extends between the lower surface of the wall 59 and the enlarged portion of the plunger 62 to bias the plunger in a downward direction. Threaded into the upper part of the bore 58 in the body 56 of the valve is a member 66 having a slot 67 at its upper end to permit axial adjustment by means of a screw driver. The lower end of the member 66 is provided with a bore 68 whose lower end is provided with a countersink and which contacts the upper part of the ball 64.

The conduit 48 is threadedly connected to a port 69 formed in the abutment 54. This port opens into an annular groove 71 extending around the outer surface of the tubular body 56. Extending inwardly from the groove 71 are small radial ports 72 which open into an annular groove 73 formed on the outer surface of the member 66. Radial ports extend from the groove 73 into the bore 68.

The conduit 49 is threadedly connected to a port 74 extending into the bore 55 and opening into an annular groove 75 formed on the outer surface of the tubular body 56. Radially-directed ports lead from the groove 75 into the bore 58 in the area immediately above the wall 59. A chamber occupied by the ball 64 is defined between the upper surface of the wall 59, the lower end of the member 66, and the surface of the bore 58. The third annular groove 76 is formed on the outer surface of the tubular body 56 of the valve and communicates with the exhaust passage 53. Extending inwardly from the groove 76 are radial ports communicating with the bore 58 in the space between the surface of the bore 58, the top of the plunger 62, and the bottom of the wall 59, this space being occupied by the coil spring 65. A lock nut 77 is provided to maintain the member 66 in its position of adjustment within the tubular body 56. Suitable grooves and O-rings to serve as sealing means are provided on either side of the grooves 71, 75 and 76 on the outer surface of the tubular body 56 and on either side of the groove 73 on the outer surface of the member 66.

The operation of the invention will now be readily understood in view of the above description. To begin with, as the apparatus is usually used, the piston rod 19 is held in a pre-determined position, which location holds the valve stem 21 at a certain position at one end of the valve range. The piston 19 is held in this first position by several elements acting upon it. First of all, the pressure from the conduit 48 operates through the valve 47 and through the conduit 49 to press on the bottom of the piston 18 to press it upwardly. It is pressed in the downward direction by the coil spring 43 and by the coil spring 42. When the valve 12 is to be moved to a second position, a suitable signal pressure arrives at the actuator through the conduit 52 and this additional air pressure operates on the top of the diaphragm 39 which presses against the pressure plate 41 and, by increasing the pressure by lowering the position of the top of the coil spring 42, increases the spring pressure on the top of the piston 18 and moves it downwardly against the contrary pressure of the air arriving through the port 51. This will place the valve in another condition. For instance, without the signal arriving through the conduit 52, the valve might be in closed position, and with the signal it might be in open position. When the actuator is set up in this way, a failure of air can operate to close the valve.

The operation of the valve 47 will be clear from inspecting FIG. 2. The main pressure air arriving from the conduit 48 passes through the port 69 into the groove 71 in the tubular body 56. The air passes through the port 72 into the groove 73 on the outside of the member 66. From there the air passes through ports into the axial bore 68. If the ball 64 is pressed against the opening of the bore 68, no air will pass. On the other hand, pressure air under the piston can flow out of the chamber under the piston, through the port 51, through the conduit 49, and into the valve by way of the port 74. From this port the air can flow into the groove 75 and through the radial ports into the chamber in which the ball lies. From there, the air can pass downwardly through the aperture 61 in the wall 59 down around the coil spring 65 outwardly through ports into the groove 76. This groove communicates with the exhaust port 53 so that air can be exhausted from the piston. When the signal air from the conduit 52 presses on the diaphragm 39, however, the button 46 follows the screw 45 downwardly, because of the pressure of the coil spring 65, and this permits the ball 64 to move away from the bore 68, which permits pressure air to flow out of the bore 68 and into the port 74 and through the conduit 49 to the underside of the piston, and the piston will move upwardly. On the other end, the downward position of the plunger 62 means that the ball 64 can rest on the aperture 61 and there will be no exhaust of fluid through the exhaust port 53. The actuator piston will move upwardly, therefore, the spring pressure, of course, increasing until the signal arriving in the conduit 52 is cut off. The piston, of course, will occupy a second position in which the air pressure on the bottom of the piston is balanced by the spring pressure above the piston. It should be noted that substantially no leakage of pressure air under the piston can take place because of the presence of an O-ring seal within part 27 and the seal 35. Pressure above the piston, of course, is vented by the entrance and exist of air from the opening 50.

The effective length of the actuator stroke can be changed by adjusting the member 56 by means of the lock nut 57. The movement of the member 56 up and down relative to the abutment 54 of the valve brings about a change in the effective area of the feed-back diaphragm 39 which, in turn, changes the effective length of the actuator stroke. This can be observed during the operation of the valve by watching the movement of the disc 22 over the scale 23. To adjust the stroking speed (air flow) it is possible to screw the member 66 up or down which effectively reduces the distance the ball 64 can travel and subsequently reduces the flow area in both the supply and exhaust ports. It should be pointed out that, when the entire valve assembly (including the tubular body 56 and its included elements) is moved vertically, this causes the diaphragm to assume an equilibrium position below the original position. In this deflected position, the diaphragm is no longer in full contact with the pressure plate 41. The result is that the affected diaphragm area (which is approximately equal to the area of the mean diameter between the outer point of support and the inner circle of contact) is greatly reduced. The resultant reduction in lift may be explained by use of an example as follows:

First of all, the original diaphragm area in its level position may be assumed to be 20 square inches. For a 3 to 15 p.s.i. signal, the change in force is 12×20 or 240 lbs. The spring rate of the feed-back spring 42 is 80 lbs. per inch, so that the resultant lift equals 240 divided by 80 or 3 inches. With the valve 56 in lowered position, the diaphragm area is 10 square inches, so that the change in force, when going from 3 to 15 p.s.i., is 12×10 or 120 lbs. The resultant movement, therefore, is 120 divided by 80 or 1.5 inches. In the example given, the stroke of the actuator can be varied in infinitely small steps between 3 inches and 1.5 inches simply by screwing the entire valve assembly in or out of the head without disconnecting any of the pressure lines or interruption of the control process.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An actuator, comprising
   (a) a housing including a cylindrical bore,
   (b) a piston slidable in the bore at one end thereof,
   (c) a piston rod extending from the piston to the exterior of the housing for the actuating function, (d) a diaphragm extending across the bore at the other end and adapted to have a control signal applied to it,
(e) a spring extending between the piston and the diaphragm,
(f) a pilot valve operated by the diaphragm having an input to which pressure operating fluid is connected,
(g) a conduit connecting the output of the pilot valve to the piston for the operation thereof, and
(h) a second spring extending between the piston and the housing at the other end of the bore, wherein the piston is provided with a seal consisting of a diaphragm of rubber-like material whose periphery is fastened relative to the surface of the bore adjacent one end of the piston, whose central portion is fastened to the underside of the piston at the said one end, and whose intermediate portion is normally doubled between the surface of the piston and the surface of the bore, the piston being provided at its other end with a seal which slides along the surface of the bore.

2. An actuator, comprising
(a) a housing including a cylindrical first bore, the housing being provided with an abutment protruding exteriorly thereof and having a second bore extending through the abutment from the exterior to the interior of the housing, an input and an output passage extending into the second bore at axially spaced portions thereof from the exterior of the abutment,
(b) an operating member in the first bore at one end thereof,
(c) a rod extending from the operating member to the exterior of the housing for the actuating function,
(d) a diaphragm extending across the first bore at the other end and adapted to have a control signal applied to it,
(e) a spring extending between the operating member and the diaphragm,
(f) a pilot valve including a tubular body mounted in the second bore and adjustable axially thereof, a valve member adjustably mounted in the tubular body at the outer end thereof, and a plunger slidably mounted in the tubular body at the inner end thereof and spring-biased downwardly, the plunger being operated by the diaphragm and having an inlet to which pressure operating fluid is connected and an outlet connected to the operating member for the operation thereof, a wall extending across the interior of the tubular body between the valve member and the plunger and having a central aperture through which an end of the plunger extends, a ball resting on the said end of the plunger, a valve seat located centrally of the inner end of the valve member, the ball being normally pressed against the valve seat by the plunger, a passage extending through the tubular member and the valve member connecting the inlet passage to the valve seat, a passage extending through the tubular member adjacent the said wall connecting a chamber around the ball to the outlet passage, and a passage extending from the interior of the tubular member to the exterior of the abutment, and
(g) means for adjusting the position of the pilot valve relative to the diaphragm to adjust the length of the stroke of the rod.

References Cited by the Examiner
UNITED STATES PATENTS

| | | | |
|---|---|---|---|
| 2,937,655 | 5/1960 | Vana | 91—387 |
| 3,151,531 | 10/1964 | Ray | 91—387 |
| 3,172,336 | 3/1965 | Warstler | 91—387 |
| 3,195,416 | 7/1965 | Linquist | 91—387 |

FOREIGN PATENTS
427,501  11/1947  Italy.

MARTIN P. SCHWADRON, *Primary Examiner.*
PAUL E. MASLOUSKY, *Examiner.*